US006330587B1

(12) United States Patent
Tedone et al.

(10) Patent No.: US 6,330,587 B1
(45) Date of Patent: Dec. 11, 2001

(54) REAL-TIME MULTIPROCESSING COMPUTER INFRASTRUCTURE FOR AUTOMATED TESTING

(75) Inventors: Damian J. Tedone, Southgate; John Raymond Schultz, Dearborn; Mark Anthony Tascillo, Canton; Norman Hiam Opolsky, Farmington Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/216,759

(22) Filed: Dec. 21, 1998

(51) Int. Cl.$^7$ .................................................. G06F 13/00
(52) U.S. Cl. .......................... 709/201; 709/222; 370/92
(58) Field of Search .................................. 709/200, 201, 709/220, 222, 224; 370/92, 93, 85.6; 364/200, 580

(56) References Cited

U.S. PATENT DOCUMENTS

| 4,773,005 | * | 9/1988 | Sullivan ................................ 364/200 |
| 5,077,670 | | 12/1991 | Takai et al. . |
| 5,214,582 | | 5/1993 | Gray . |
| 5,265,832 | | 11/1993 | Wesling et al. . |
| 5,349,649 | | 9/1994 | Iijima . |
| 5,371,852 | * | 12/1994 | Attanasio et al. ..................... 709/201 |
| 5,646,865 | | 7/1997 | Alfaro et al. . |
| 5,745,390 | * | 4/1998 | Daneshgari .......................... 364/580 |
| 5,757,640 | | 5/1998 | Monson . |
| 6,122,639 | * | 9/2000 | Babu et al. .......................... 707/103 |

* cited by examiner

Primary Examiner—Ayaz Sheikh
Assistant Examiner—Khanh Quang Pinh
(74) Attorney, Agent, or Firm—Jerome R. Drouillard

(57) ABSTRACT

A system and method for powertrain testing of a powertrain under load using a computer network includes a plurality of computer nodes for monitoring and adjustably controlling the powertrain and applied load for acquiring powertrain data relating to powertrain performance. A shared memory is connected to the plurality of computer nodes for receiving in real time the powertrain data generated by each of the plurality of computer nodes. An integrating computer node is connected to the shared memory for receiving in real time powertrain data and is arranged to send different commands to the plurality of computer nodes as part of a powertrain testing process. Further, the present invention allows for the powertrain testing of a powertrain in deterministic real time to develop the powertrain, as well as create a powertrain calibration.

9 Claims, 6 Drawing Sheets

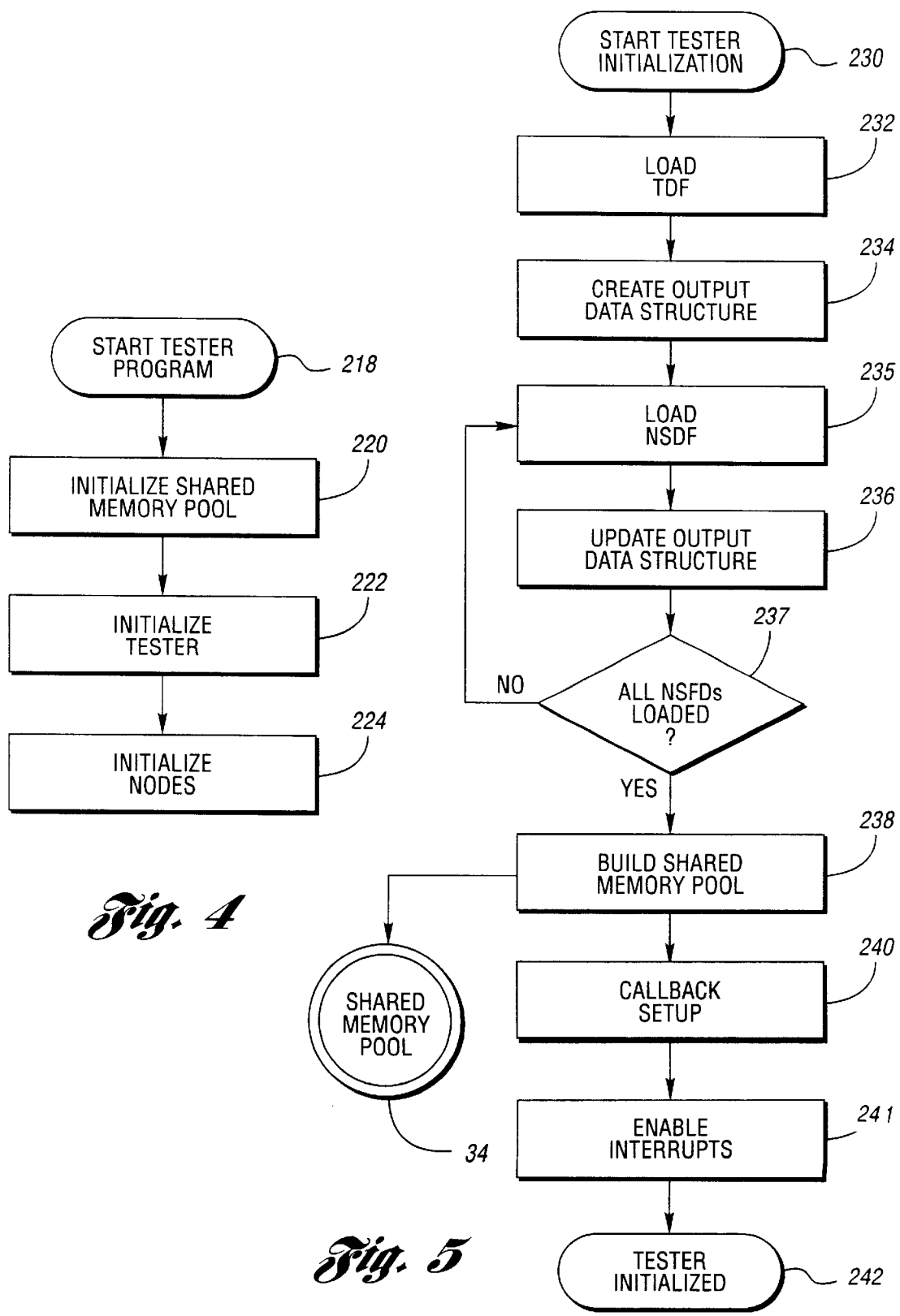

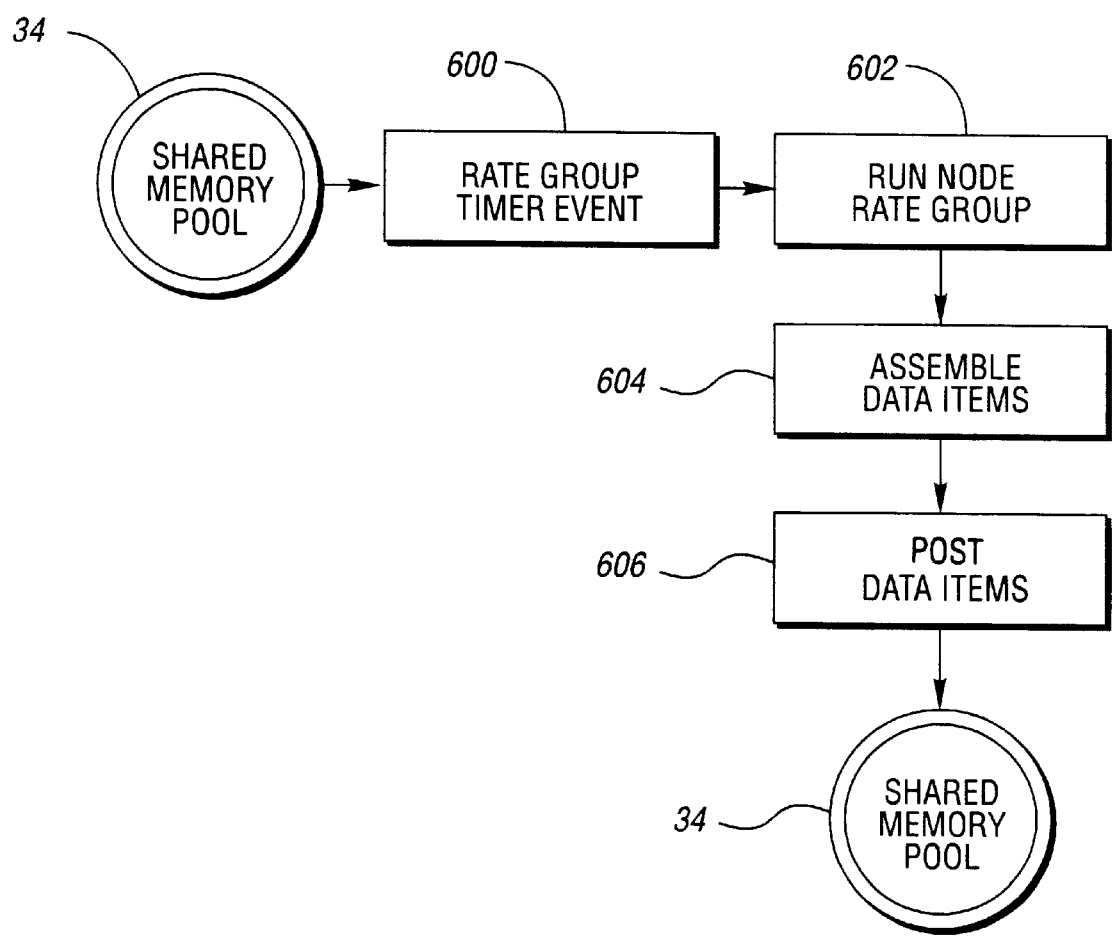

REAL-TIME MULTIPROCESSING COMPUTER INFRASTRUCTURE FOR AUTOMATED TESTING

TECHNICAL FIELD

The present invention relates to powertrain testing systems which utilize shared memory to acquire data from and send data to nodes within a network in real time for the purpose of powertrain development.

BACKGROUND ART

Powertrain testing systems are well represented in the prior art. In the typical powertrain testing system, multiple test subsystems are employed to adjust powertrain operating setpoints, acquire powertrain performance data, and control test facility equipment. Typical subsystems in the test room include data acquisition, facility control, combustion analysis and a powertrain control module (PCM) interface.

Recent developments in powertrain testing require test site subsystem integration. Test site integration is typically achieved by providing Local Area Network (LAN) access. Standardized off-line data transfer protocols are used to transfer the data between network nodes over serial or ethernet based architectures. While industry standards have been developed for these architectures they do not support high speed, real-time and deterministic-type operation.

In addition, such off-line integration arrangements cannot effectively combine, time align, and process test facility data from various pieces of powertrain test subsystems. Thus, a need exists for a test-site integrated powertrain testing system capable of deterministic real-time data transfer for powertrain development.

SUMMARY OF THE INVENTION

Accordingly, it is an objective of the present invention to provide a system and method for powertrain testing by integrating all test site subsystems to communicate in real time.

In carrying out the above object and other objects and features of the present invention, a high speed real-time data acquisition computer network is utilized for powertrain testing. The computer network includes a plurality of computer nodes for monitoring and adjustably controlling the powertrain and applied load for acquiring data relating to powertrain performance. A shared memory is connected to the plurality of computer nodes for receiving in real time the data generated by each of the plurality of computer nodes. An integrating computer node is connected to the shared memory for receiving in real time data and is arranged to send different commands to the plurality of computer nodes as part of a powertrain testing process. The integrating computer node performs powertrain testing calculations to integrate in real time generated powertrain data.

The above objects, features and advantages of the present invention will be appreciated by one of ordinary skill in the art from the following detailed description of the best modes for carrying out the invention when taken in conjunction with the accompanying drawings.

BRIEF DESCRIPTION OF THE DRAWINGS

FIG. 4 is a flowchart illustrating system startup and initialization according to the present invention;

FIG. 5 is a flowchart illustrating the tester initialization process according to the present invention;

FIG. 10 is a flowchart illustrating data collection, assembly and distribution by the processing node to the shared memory according to the present invention.

BEST MODE FOR CARRYING OUT THE INVENTION

Figure 1:
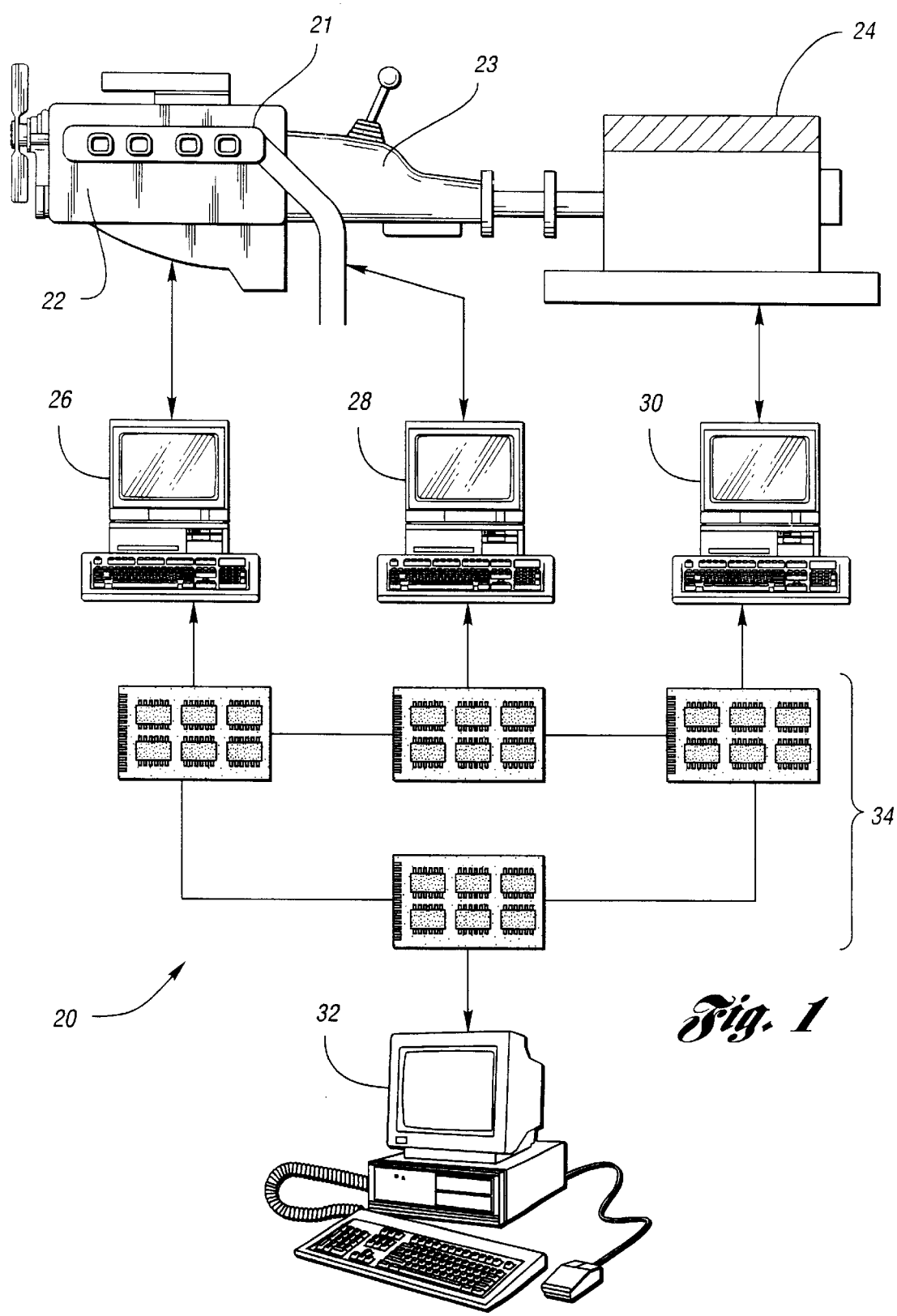
FIG. 1 is a block diagram illustrating a powertrain testing system according to the present invention.

Referring now to FIG. 1, a block diagram representing a powertrain testing system 20 is shown. Powertrain testing system 20 includes a powertrain 22 coupled to a powertrain dynamometer 24. The powertrain 22 is electrically coupled to a powertrain control module computer 26 and a combustion analyzer computer 28. The powertrain dynamometer 24 is electrically coupled to test facility control computer 30. Powertrain control module computer 26, combustion analyzer computer 28, and test facility computer 30 are each in electrical communication with a shared memory 34. Shared memory 34 is in turn in electrical communication with a client workstation computer 32.

The present invention provides real-time powertrain testing of the powertrain 22 through the use of shared memory 34. Real time in this case is defined as deterministic data transfer rates of up to 15 Kilobits per second. Shared memory 34 includes a plurality of shared memory computer boards. The shared memory computer boards are of the type manufactured by Systran. Although, the preferred embodiment of the present invention utilizes the Systran shared memory boards other shared memory boards are available and may be used in place of the Systran shared memory boards. Each computer or node in the powertrain testing system 20 is connected to the shared memory 34 such as by insertion of a suitable computer board into each computer.

Powertrain 22, generally, includes an engine 21 and a transmission 23. Powertrain 22 is developed by varying a plurality of powertrain parameters or setpoints to arrive at optimum engine performance. The powertrain dynamometer 24 simulates real world driving events by exercising the powertrain 22. The combustion analyzer computer 28 monitors the engine combustion chamber pressure to obtain information pertaining to the engine combustion process. As dynamometer 24 exercises the powertrain 22, the powertrain control module 26 dynamically adjusts the powertrain parameters so that powertrain performance remains optimal over the full range of operating conditions.

The test facility control computer 30 controls the powertrain dynamometer 24 and prescribes how the dynamometer will exercise the powertrain 22. Shared memory 34 receives powertrain data from the powertrain control module computer 26, the combustion analyzer computer 28, and the test facility control computer 30. The powertrain data received by the shared memory 34 is then retrievable by the client workstation computer 32.

Client workstation computer 32 is capable of being programmed to receive the powertrain data stored in memory 34 and perform powertrain calculations to determine whether the powertrain 22 is operating at an optimum performance level. Client workstation computer 32 has the capability to adjust the powertrain setpoints by passing commands back to the shared memory 34 for storage therein. Once the commands are stored in the shared memory 34, the powertrain control module computer 26, the combustion analyzer computer 28, and the test facility computer 30 will access and process the commands.

The commands promulgated by client workstation computer 32 are used by the powertrain control module computer 26 to adjust the powertrain setpoints. The test facility control computer 30 uses the commands from the shared memory 34 to direct the powertrain dynamometer 24 to exercise the powertrain 22. The combustion analyzer computer 28 will record the powertrain 22 performance. The new performance data acquired by combustion analyzer computer 28 is then passed to the shared memory 34 where client workstation computer 32 is able to access and receive the new powertrain data and perform additional powertrain testing calculations if required.

Figure 2:
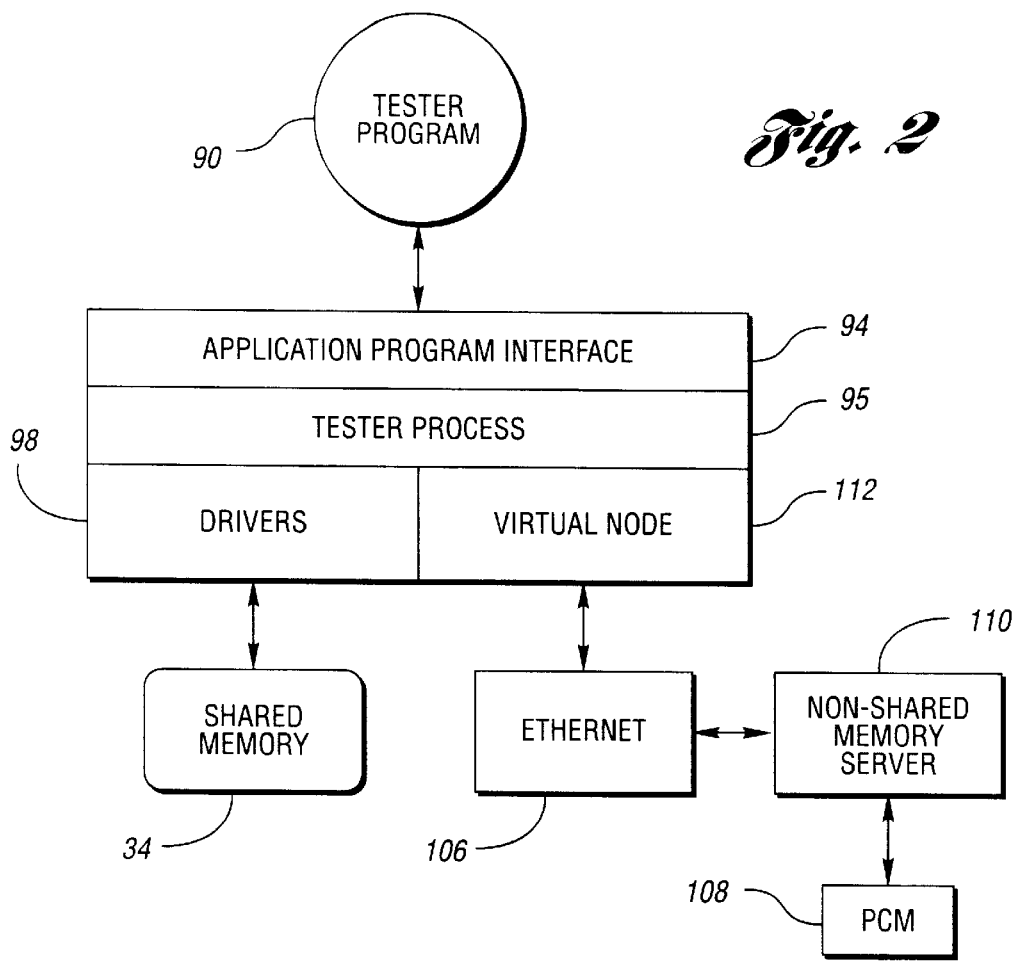
FIG. 2 is a block diagram illustrating the software and hardware computer architecture of the present invention.

Referring now to FIG. 2, the hardware and software architecture of the powertrain testing system 20 is diagrammatically illustrated. A tester program 90 such as Matlab or a like software application resides on client workstation computer 32 and is used to run the powertrain development tests. The tester program 90 has control over the powertrain testing subsystems and directs their operation during a powertrain test. Tester program 90 is used to ultimately develop an optimal calibration for the powertrain 22, as well as to generally develop the powertrain 22.

With continuing reference to FIG. 2, an application program interface (API) 94 software layer communicates with the tester process layer (TPL) 95. The API 94 is responsible for facilitating the establishment of test parameters and transmission of test data during execution of a powertrain development testing. The tester process layer (TPL) 95 communicates with the shared memory drivers to initialize and build the shared memory 34. The shared memory drivers 98 act as a translator between the shared memory 34 and the TPL 95. Shared memory drivers 98 are arranged to accept commands from the TPL 95, and translate the commands into specialized commands for the control of the shared memory 34.

The TPL 95 passes data and/or commands from the tester program 90 through to the shared memory 34. Once data or commands are received by the shared memory 34 then test facility computer 30 or any other computer node attached to the shared memory 34 may have access to it. In the same manner, data is transferred from the combustion analyzer computer 28 to the shared memory 34 for retrieval by the tester program 90.

As further shown, it may be more feasible to connect a powertrain control module (PCM) 108 to an interface, such as server 110, which is not in direct communication with the shared memory 34. Server 110 communicates with an Ethernet 106 which is used to transfer data from the powertrain control module 108 to a virtual node 112. Once the data is accessible by the virtual node 112, it can then be used by the tester program 90 in the powertrain testing process.

Figure 3:
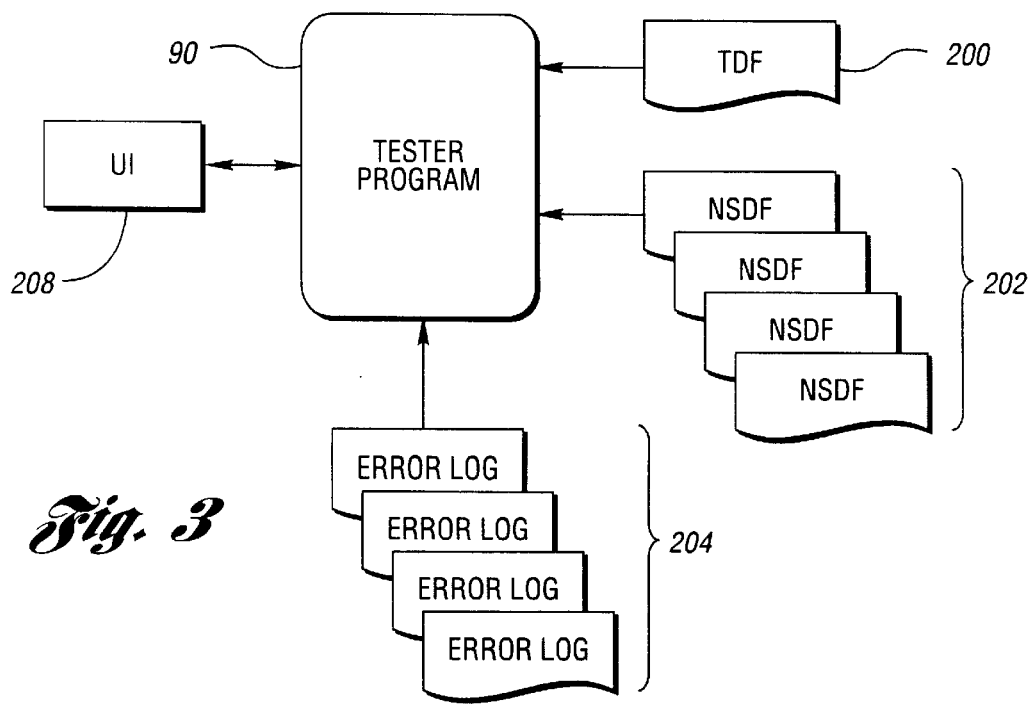
FIG. 3 is a block diagram illustrating the components of the tester application program.

Now referring to FIG. 3, the components of the tester program 90 are shown. Tester program 90 preferably includes a user interface 208 to provide a user with a "user-friendly" environment to operate the tester program. The tester program 90 further contains a test descriptor file (TDF) 200, which establishes the test requirements for each node. The tester program 90 also uses a set of node self-descriptor files (NSDF) 202 for each node in the powertrain testing system 20. The NSDF file is a formatted ASCII text file which describes the resources provided by each node in the powertrain testing system 20. In the preferred embodiment, a NSDF file version number is contained within the NSDF file and used to confirm that the node is using the same version of the NSDF file as the client workstation computer 32. In order to resolve node initialization and run time errors, an error log 204 is provided for each node. Each node completes a test setup and generates a response to the tester program 90. The response is a go/no go with supporting information for the cause of the no go condition.

In operation, the TPL 95 compares the contents of the TDF with the available services described in each node's NSDF 202. If all the services asked for by the TDF 200 are available according to each node's NSDF 202, then the TPL configures the shared memory 34 into data and setpoint/command areas for each node. If the services requested by the TDF 200 are not available for a particular node, then an error is generated.

Now referring to FIG. 4, the steps required to set up the powertrain testing system 20 are shown. When the tester program 90 is started, it must first initialize the shared memory 34 as depicted in block 220. The tester program 90 initializes the shared memory 34 by running initialization routines for the client workstation computer 32 as depicted in block 222, and nodes as depicted in block 224. The initialization routines set up the shared memory 34 by properly setting the registers on the shared memory boards. Initialize tester routine 222 and initialize nodes routine 224 are part of the TPL 95 and are called by the tester program 90. At this point the shared memory 34 is partitioned into different powertrain data and setpoint/command areas for each node.

When tester program 90 or a processing node is to shut down, a terminate node routine is carried out to disarm all shared memory 34 interrupts being monitored. Similarly, a terminate tester routine disarms all shared memory interrupts that the tester program is monitoring.

Referring to FIG. 5, a flowchart is provided to further illustrate the tester initialization routine of block 222. Tester program 90 starts tester initialization at block 230, a tester load TDF routine loads the TDF file at block 232. Each IO descriptor record is passed to a callback routine which is responsible for building a data structure containing information required for the test.

The TDF file contains information required to initialize the output data structure which includes the names of all items to be included in the test. The output data structure describes how the shared memory is partitioned and provides a way to determine where the data is stored in the shared memory. The output data structure is created at block 234. The tester program 90 then loads NSDF files at block 235, one NSDF file for each node. At block 236, the output data structure is updated to reflect information received from processing the NSDF files of each node.

At block 237, a "true" indicator is provided if all processing is completed correctly (as indicated by the yes arrow), while a "false" indicator is provided (as indicated by the no arrow) if the TDF or the NSDF file name is not found or if the callback routine returns a false. Positive error codes are returned if the loader routine initiates the failure; otherwise, all other error codes are negative of the IO descriptor record number. This provides a guide for finding the problem.

The output data structure which has received items from the TDF and NSDF files at blocks 232 and 235 has all the information required to build the shared memory pool at block 238. At block 240, all of the data, setpoints and commands are set up on the client workstation computer 32 based on information parsed from the TDF and NSDF files. The callback routine of block 240, may be used to add items from the TDF and NSDF files to the output data structure. However, if omitted by specifying "no" in the calling list, the TDF loader routine simply adds all TDF records to the output data structure. The NSDF loader routine adds those items required by the TDF. After all the NSDF files have been processed, the tester program 90 must call and build the shared memory. This routine transfers items from the output data structure to the shared memory 34. Interrupt enabling of the shared memory pool 34 addresses for the client workstation computer 32 is accomplished when the shared memory pool is built as indicated in block 241.

The shared memory 34 always begins at a fixed address. All addresses within the shared memory 34 are stored as offsets from the disk space address. The table below shows how an N-node network is to be partitioned.

| |
|---|
| Node 1 Initialization Area |
| Node 1 I/O Descriptor Region |
| Node 1 I/O Transfer Region |
| . |
| . |
| . |
| Node 2 Initialization Area |
| Node 2 I/O Descriptor Region |
| Node 2 I/O Transfer Region |
| . |
| . |
| . |
| Node N Initialization Area |
| Node N I/O Descriptor Region |
| Node N I/O Transfer Region |

The information stored in the shared memory 34 informs the user of the client workstation 32 how many nodes there are and how to find each node initialization area. The initialization area supports node specific communications between the node and the client workstation computer 32. The node initialization area then links the user to the I/O descriptor region for each rate group. Each data and control parameter passed over the shared memory 34 has its own I/O descriptor region. This region is used to define types of parameters and their fundamental characteristics. At this point, the tester is initialized as indicated in FIG. 5 at block 242.

Figure 6:
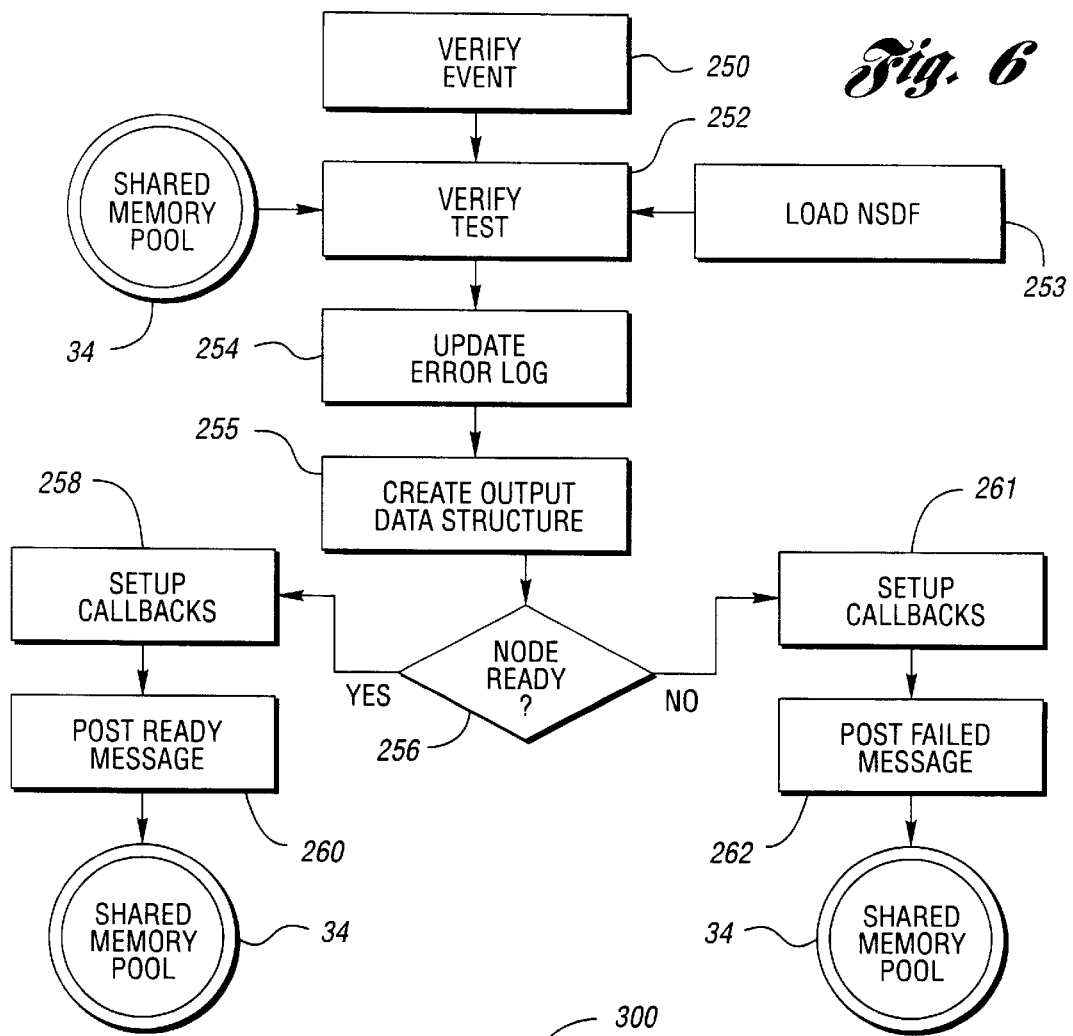
FIG. 6 is a flowchart illustrating the node initialization process according to the present invention.

Now referring to FIG. 6, node initialization is illustrated. The initialization is started at block 250 in response to a verification event initiated by the client workstation computer 32. At block 252, the processing nodes verify the test to be conducted by comparing the contents of the shared memory pool 34 and the contents of their NSDF files. The NSDF files are loaded at block 253. The processing nodes are not required to load the TDF file because they have access to the I/O descriptor lists in the shared memory pool 34. Accordingly, the processing nodes need only process their own NSDF file. A primary purpose of the verification process is to compare the NSDF file contained on each processing node with the shared memory pool built by the tester program. At block 254, all discrepancies which exist are recorded to an error log file. At block 255, the output data structure is created and used by the processing nodes to perform name translations.

At block 256, each processing node is asked to examine its I/O descriptor region and determine whether the node can run the test. If an error occurs, as indicated by the "no" arrow, a callback routine is setup at block 261 and a post or node failed message is sent to the shared memory 34. The callback routine is responsible for writing error messages and for adding items to the output data structure. If no errors are present, as indicated by the "yes" arrow, a callback routine is setup at block 258, and a post or node ready message is sent to the shared memory 34 at block 260. Once the test setup is verified interrupt enabling of the shared memory 34 addresses for each processing node may be completed.

Figure 7:
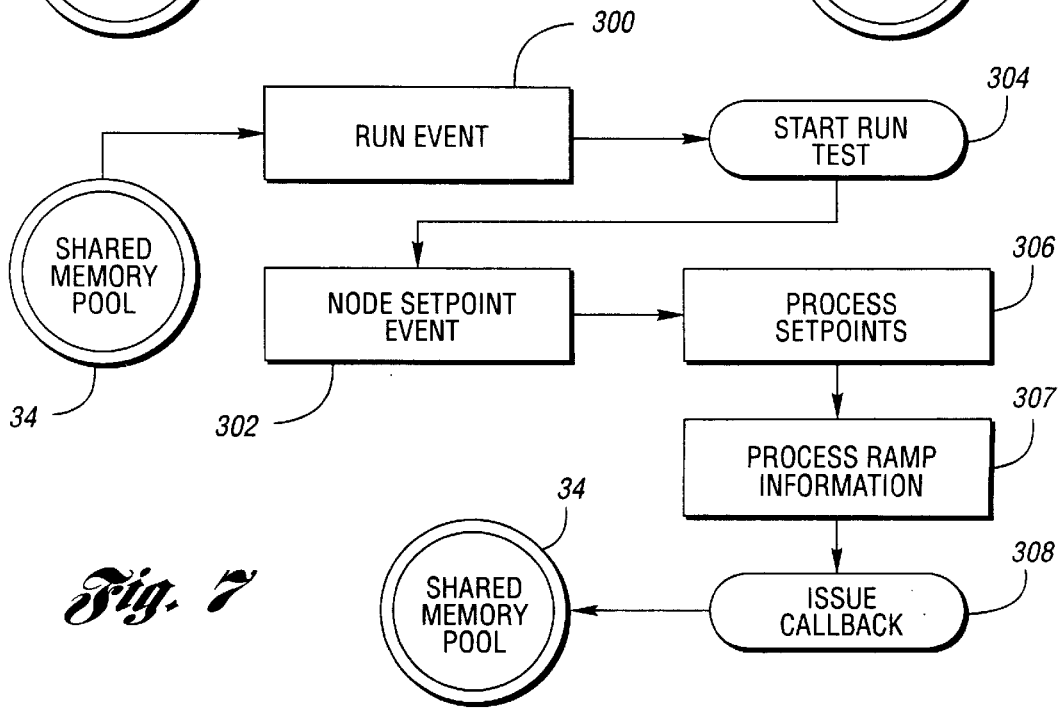
FIG. 7 is a flowchart illustrating running a powertrain test and adjusting facility and powertrain setpoints according to the present invention.

Now referring to FIG. 7, a flowchart illustrates powertrain testing in accordance with the present invention. To run a powertrain test a run event at block 300 must be received by each node. A run test routine is initiated at block 304 upon receipt of the run event 300. At this point, each node begins sending and receiving data. A node setpoint event, at block 302, may be sent by the client workstation computer 32 and retrieved by each node. The node setpoint event is a command to the node to alter the powertrain setpoints and/or facility setpoints. For example, the setpoints may be changed to alter throttle level, dynamometer speed, engine temperatures, engine pressures, gas flows and many other powertrain control parameters.

At block 306, the command to alter the setpoints is processed by the processing node. At block 307, ramp information is processed by the processing node. The ramp information is used by the processing node software to determine how quickly the setpoint must be achieved. A callback routine at block 308 processes a series of computer instructions required to complete the setpoint adjustments. Setpoints and commands can only be initiated by the tester program 90 and sent directly to a particular processing node. Processing nodes cannot control the client workstation 32 nor request anything of it.

Figure 8:
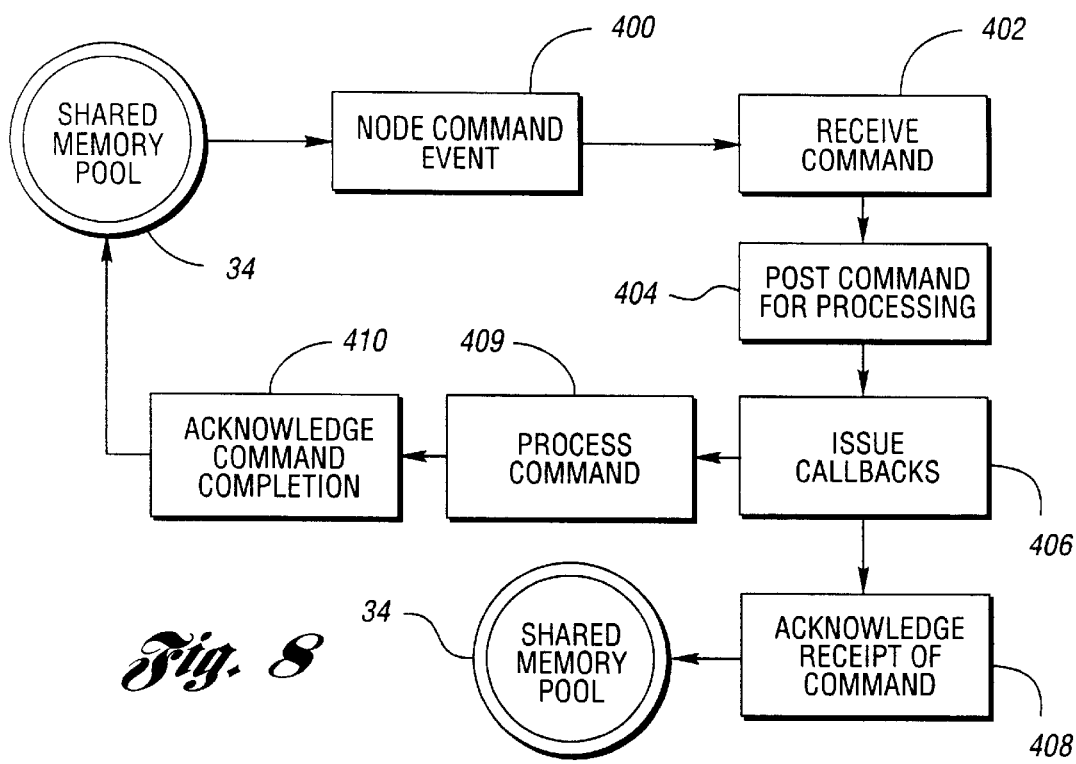
FIG. 8 is a flowchart illustrating a node receiving a command and processing the command according to the present invention.

Now referring to FIG. 8, a flowchart illustrates how commands are carried out by the powertrain testing system 20. A processing node computer receives an interrupt when the client workstation computer has updated a command in a command memory location of the shared memory 34. The interrupt in turn triggers a callback that processes the command. A command is initiated by a node command event at block 400. Commands are initiated via numeric codes associated with specific functions capable of being performed by the processing node. The command is received by the node at block 402, and the command is posted for processing at block 404. A callback is issued at block 406 and an acknowledgment that the command has been received is sent back to the client workstation computer 32, at block 408, through the shared memory 34. Further, an additional callback is issued at block 406 to process the command as indicated by block 409. An acknowledgment that the command has been completed is sent, at block 410, to the client workstation computer through the shared memory 34. A return code of false means that the command was not completed.

Figure 9:
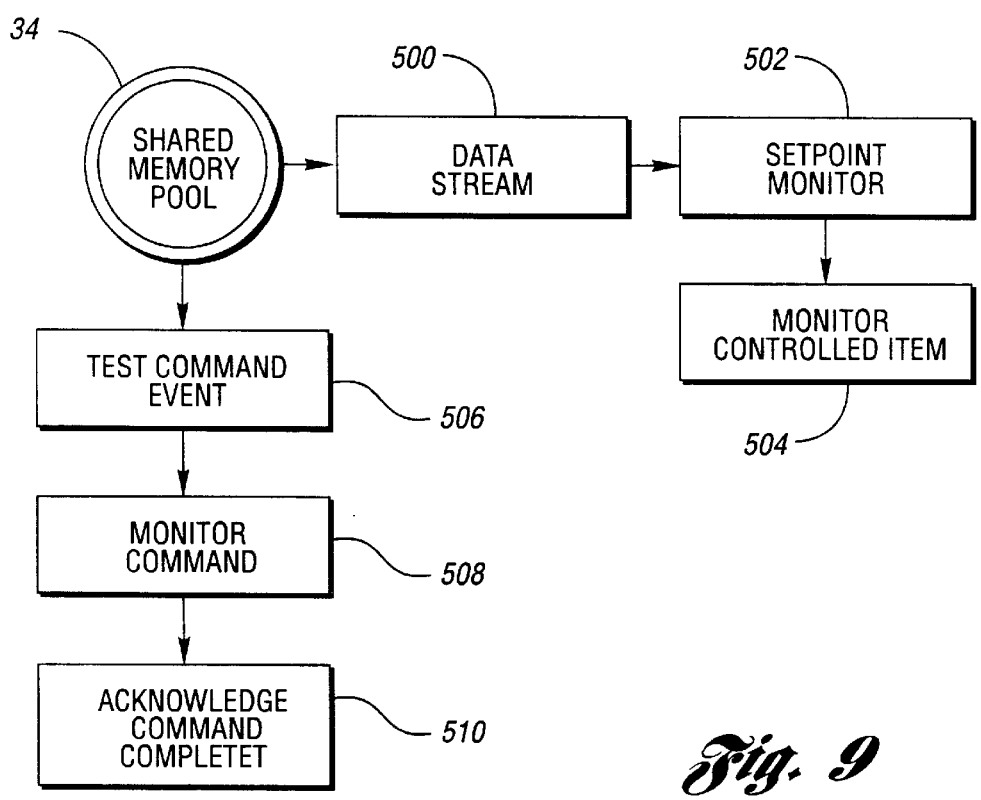
FIG. 9 is a flowchart illustrating the data and command monitoring and collection according to the present invention.

Now referring to FIG. 9, a flowchart illustrates how the tester program 90 responds to a data stream received from the shared memory 34. A setpoint monitor routine at block 502 monitors the setpoints contained in the data stream 500. Controlled items within the data stream are monitored at block 504. A tester command event is received at block 506. At block 508 the monitor command routine tracks the command status. The command is either acknowledged as complete or not complete at block 510. If the command is complete then the tester may reuse the command if the command is not complete the tester program must wait to reuse the command.

Now referring to FIG. 10, a flowchart illustrates how a node handles data for a particular rate group. A rate group is a group of data acquired by a node and received by the client workstation computer 32 which is required to be update at the same rate or frequency. When a rate group timer event is received by a node, at block 600, a node rate group routine is initiated at block 602. The node rate group routine assembles the data at block 604 for all data in that rate group. The data is then posted to the shared memory 34 at block 606. The tester program 90 will then be alerted that the rate group is available for retrieval. A tester rate group routine receives and records the data items for that particular rate group.

As such, the present invention utilizes real-time information from the nodes in the powertrain testing system and sends commands back to the nodes to develop a powertrain. While the best mode contemplated for practicing the invention has been described in detail, those familiar with the art to which this invention relates will recognize various alternative designs and embodiments for practicing the invention as defined by the following claims.

What is claimed is:

1. A computer network for testing of a powertrain under load comprising:
   a plurality of computer nodes for monitoring and adjustably controlling the powertrain and the load for acquiring powertrain performance data generated by the powertrain;
   a shared memory connected to said plurality of computer nodes for receiving in real time the data acquired by each of the plurality of nodes, the shared memory having a configurable memory area; and
   an integrating computer node connected to the shared memory for retrieving in real time all of the data stored in the shared memory, and for sending commands to the shared memory to control the operation of the plurality of computer nodes, wherein the integrating computer node is responsive to computer executable instructions to integrate in real time all of the data stored in the shared memory, and computer executable instructions in the form of a tester program for conducting powertrain testing, wherein the integrating computer node is further responsive to computer executable instructions in the form of:
   a tester process;
   an application program interface for allowing the tester program to interact with the tester process; and
   a shared memory driver, wherein the tester process is arranged to facilitate use of the shared memory by the tester program.

2. The computer network of claim 1 wherein the tester program further comprises:
   a node self-descriptor file which describes a monitoring, control and acquiring powertrain performance data capability of each of the plurality of computer nodes;
   a test description file which describes the powertrain testing to be conducted; and
   an error log file for receiving powertrain testing errors.

3. The computer network of claim 1 wherein the tester process comprises an output data structure which describes the configuration of the memory area of the shared memory.

4. The computer network of claim 1 wherein the tester process comprises a tester initialization routine for initializing the integrating computer node.

5. The computer network of claim 1 wherein the tester process comprises a node initialization routine for initializing the plurality of computer nodes.

6. The computer network of claim 1 wherein the tester process comprises a run test routine for running a powertrain test.

7. The computer network of claim 1 wherein the tester process comprises a receive command routine for receiving and processing a powertrain command.

8. The computer network of claim 1 wherein the tester process comprises a setpoint monitor routine for enabling the plurality of computer nodes to monitor a powertrain setpoint.

9. A method for powertrain testing of a powertrain under load comprising:
   monitoring and adjustably controlling a powertrain and the load for acquiring powertrain data generated by a plurality of computer nodes connected to the powertrain;
   receiving in real time the data acquired by each of the plurality of computer nodes connected to a shared memory; and
   retrieving in real time all of the data stored in the shared memory, and sending commands to the shared memory to control the operation of the plurality of computer nodes, wherein the data stored in the shared memory is integrated in real time and a report is generated based on the integrated data, and the monitoring and adjustably controlling the powertrain and the load further comprises:
   retrieving a node self-descriptor file which describes a monitoring, control and acquiring powertrain data capability of each the plurality of computer nodes;
   retrieving a test description file which describes the powertrain testing to be conducted; and
   retrieving an error log file for receiving powertrain testing errors.

* * * * *